Patented Apr. 16, 1940

2,197,552

UNITED STATES PATENT OFFICE 2,197,552

MANUFACTURE OF ABRASIVE PRODUCTS

Joseph N. Kuzmick, Passaic, N. J., assignor to Raybestos-Manhattan, Inc., Passaic, N. J., a corporation of New Jersey No Drawing. Application December 10, 1937
Serial No. 179,111

9 Claims. (Cl. 51—298)

This invention relates to the manufacture of abrasive products and more particularly to abrasive wheels wherein the abrasive particles are bonded with an organic bond, such as rubber, shellac, or a synthetic resin.

A prime object of this invention is to produce organic bonded abrasive or grinding wheels of greatly improved durability without impairment of cutting efficiency. Another object is to provide a secondary bond for the abrasive particles, thereby greatly decreasing the limitations now common with organic bonded grinding wheels. Other objects will be apparent as the invention is disclosed.

Organic bonds, more specifically rubber and synthetic resins, in grinding wheels are now extensively used. Wheels of this type are capable of operation at high peripheral speeds, resulting in faster removal of metal per unit of wheel wear, with consequent economy to the user.

As a result of the practice of my invention, I find that the durability of an organic bonded grinding wheel can be increased as much as 100% without decreasing the cutting qualities. I have found that certain elements in Group VI of the Periodic System, more specifically selenium, when incorporated in the bond produce surprisingly unexpected results, such as greatly increased durability, higher tensile strength and greater resistance to heat in operation, without impairing cutting efficiency.

Selenium is a non-metal of the sulfur group and occurs in several modifications, i. e. (a) a metallic, hexagonal, gray, crystalline powder, density 4.80, M. P. 217° C., (b) a crystalline monoclinic powder, (c) an amorphous red powder.

I have found that selenium tends to fuse at temperatures substantially under its melting point in the presence of synthetic resins or rubber. The addition of sulfur promotes this fusion and, although not necessary, is beneficial. If this fusion is carried along in the presence of an organic bond through a curing cycle normally used in baking abrasive articles, it appears on cooling that the greater portion of the selenium remains in said fused condition without subsequent recrystallization, resulting in a complex bond which I have termed a primary and secondary bond, the organic bond being the primary bond and the selenium the secondary bond. This combination of primary and secondary bonds apparently forms a lattice-work structure wherein the selenium has definite bonding strength without subjugating its value as a loading or distending agent. Within a certain range the increase in bond strength through the use of selenium is almost directly proportional to the percentage used; for example an addition of 15 to 50% of selenium by weight on the organic bond gives a corresponding increase in tensile strength, whereas the durability of the finished product increases 20 to 80% with practically no change in cutting efficiency.

It is well known that 13% of bond by weight in an organic bonded abrasive wheel represents about the maximum amount which should be generally used. Higher percentages are used only in very special abrasive articles, such as thin cutting-off wheels. The use of higher percentages of bond has up to the present been avoided or precluded for several reasons. In synthetic resin bonded abrasive wheels, the use of over 13% bond is complicated by manufacturing difficulties, such as delaminations and soft centers. The finished abrasive product, even if properly bonded, is slow cutting and unduly heats the work being ground. While rubber bonded abrasive wheels containing over 13% of bond are not as difficult to manufacture, their use is practically precluded due to the great amount of smoke and odor of burning rubber evolved during grinding. These difficulties can now be obviated by allowing the percentage of organic bond to remain at a level consistent with trouble-free manufacturing procedure and good cutting qualities, while utilizing the addition of selenium as a secondary bond to increase the durability of the wheel.

An example of a synthetic resin bonded abrasive wheel made in accordance with my invention will now be given. I use the following proportions:—

| | Parts by weight |
|---|---|
| #36 alumina as the abrasive | 700 |
| Selenium | 40 |
| Pulverized, potentially reactive, synthetic resin | 80 |
| Liquid synthetic resin | 20 |

The abrasive alumina granules are charged into a suitable device, such as a dough mixer, and the liquid synthetic resin is added with stirring to thoroughly wet the granules. The pulverized synthetic resin and selenium are now added and quickly stirred in, the powdered resin and selenium previously being commingled together. The mix when ready to discharge will be loose and granular, each granule of abrasive being coated with a thoroughly commingled mixture of resin and selenium. The mix is spread and leveled in an annular mold of desired size, equipped with a follower plate for pressing. The mass in this form is pressed cold in a hydraulic ram press at a pressure of approximately 2000 pounds per square inch. The article is discharged from the mold and baked in an oven to convert the synthetic resin or primary bond to the infusible stage. During this baking cycle, which may be stepped at intervals starting at 200° F. up to 400° F. for completion, the selenium fuses, forming the secondary bond.

The benefits of the use of selenium are obtained with wide variations of the above procedure. For example, I may employ the use of hot pressing, or heat treating of the mix followed by hot or cold pressing, or I may substitute resin solvents such as furfural or furfuryl alcohol for the liquid synthetic resin.

As showing the superiority obtained in such a synthetic resin bonded cut-off wheel by the use of selenium, the following example of two wheels identical in size, abrasive content and bond content, may be given, wheel A containing selenium and wheel B containing (instead of selenium) powdered alumina in the same volumetric proportions. These two wheels when run under identical conditions, cutting off the same type of material yield the following results:—Wheel A produces a total of 210 cuts, while wheel B produces a total of 112 cuts. Although wheel A produces 98 more cuts than wheel B, the time per cut is the same. Also, specimens cut with wheel A show less heat discoloration than those cut with wheel B.

An example of a rubber bonded wheel made in accordance with the invention will now be given. I utilize the following proportions:—

| | Parts by weight |
|---|---|
| Rubber, crude | 10 |
| Selenium | 3 |
| Sulfur | 5 |
| Lime | 1 |
| Alumina, #16 mesh | 80 |

The rubber, selenium, sulfur, and lime are intimately mixed or compounded on a conventional mixing mill. The mixed compound in the form of a sheet or pad is then repeatedly passed through differential rolls, adding an increment of abrasive with each pass until all of the abrasive is taken up by the rubber compound. The resulting sheet is cut by any convenient means to form a wheel of desired dimensions, and this is pressed and heated to vulcanize the rubber, forming the primary bond. During the heating or vulcanizing cycle the selenium is converted to the secondary bond.

Wide variations of this procedure may be used. For example, concentrated latex may be substituted for the crude rubber and the mass may be mixed in a dough mixer and subsequently formed and vulcanized, or I may utilize the process described in U. S. Patent 1,990,737.

As showing the increased durability in such a rubber bonded wheel with the use of selenium, the following example of two wheels identical in size, abrasive content, and bond content may be given, wheel C containing selenium and wheel D not containing selenium. These two wheels when run under identical conditions, grinding stainless steel yield the following results: wheel C removes 190 pounds of metal at the rate of 14.4 pounds per hour, while wheel D removes 120 pounds of metal at the rate of 13.9 pounds per hour. Although wheel C removes 70 pounds more metal, the removal per hour is substantially the same.

I have found that I can substitute tellurium for the selenium in the above examples in the same volumetric proportions for the secondary bond. In comparison I prefer to use selenium because of its lower melting point. I may also substitute compounds of these elements. For example, I may employ selenium sulphide or tellurium sulphide for the selenium in the same volumetric proportions. In comparison with selenium sulphide, selenium is preferred because of its higher melting point.

The method of manufacturing abrasive products embodying the invention and the advantages accruing therefrom will in the main be apparent from the above detailed description thereof. It will be further apparent that many changes may be made in the proportions of the ingredients used and in the steps of the process of making the final abrasive product, without departing from the spirit of the invention as defined in the following claims.

I claim:

1. An abrasive product comprising abrasive granules bonded with synthetic resin and selenium.

2. An abrasive product comprising abrasive granules bonded with rubber and selenium.

3. An abrasive product comprising abrasive granules bonded with synthetic resin and a material selected from a group consisting of selenium, tellurium and sulphide compounds thereof.

4. An abrasive product comprising abrasive granules bonded with rubber and a material selected from a group consisting of selenium, tellurium and sulphide compounds thereof.

5. A cured abrasive product comprising abrasive granules bonded with a primary bond of cured synthetic resin and a secondary bond of fused selenium.

6. A cured abrasive product comprising abrasive granules bonded with a primary bond of cured rubber and a secondary bond of fused selenium.

7. A cured abrasive product comprising abrasive granules bonded with a cured organic primary bond selected from a group consisting of shellac, rubber and synthetic resin and with a fused secondary bond, the secondary bond being a material selected from a group consisting of selenium, tellurium and sulphide compounds thereof.

8. A cured abrasive product comprising abrasive granules bonded with a cured organic primary bond selected from a group consisting of shellac, rubber and synthetic resin and with fused selenium as a secondary bond.

9. A cured abrasive product comprising abrasive granules bonded with a cured organic primary bond selected from a group consisting of shellac, rubber and synthetic resin and with fused tellurium as a secondary bond.

JOSEPH N. KUZMICK.